United States Patent [19]
Tsao et al.

[11] Patent Number: 4,578,713
[45] Date of Patent: Mar. 25, 1986

[54] MULTIPLE MODE BINARY IMAGE PROCESSING

[75] Inventors: Sherman H. Tsao, Plano; Wayne P. Sharum, Austin, both of Tex.

[73] Assignee: The Mead Corporation, Dayton, Ohio

[21] Appl. No.: 633,120

[22] Filed: Jul. 20, 1984

[51] Int. Cl.$^4$ ............................................. H04N 1/40
[52] U.S. Cl. ..................................... 358/283; 382/50; 382/52; 358/298
[58] Field of Search ............... 358/280, 282, 283, 298; 382/9, 52, 50, 81

[56] References Cited

U.S. PATENT DOCUMENTS 4,349,846  9/1982  Sekigawa ........................... 358/283

OTHER PUBLICATIONS

D. R. Thompson, "Digital Halftone Method for Matrix Displays" I.B.M. Technical Disclosure Bulletin, vol. 20, No. 1, Jun. 1977.
G. K. Machol, "Pseudo Halftone for Representing Continuous Tone Images in Black-White Fascimile Systems" I.B.M. Technical Disclosure Bulletin, vol. 9, No. 6, Nov. 1966.
P. Stucki, "Optimal Digital Halftone Pattern Generation Method" IBM Technical Bulletin, vol. 17, No. 9, Feb. 1975.
J. A. Yule, "Advances in Printing Science and Technology, vol. 3—Halftone Printing," W. H. Banks Ed., Permagon Press, New York, 1964, pp. 17-42.
B. Dom, "Gray Scale Compression in Reprography," Photographic Sciences and Engineering, vol. 25, No. 5, Sep./Oct., 1981.

Primary Examiner—Edward L. Coles, Sr.
Attorney, Agent, or Firm—Biebel, French & Nauman

[57] ABSTRACT

Print/no-print values are assigned to individual picture elements (pixels) representative of a document to be reproduced or displayed for text, continuous tone, and halftone data. The image data comprises gray scale values individually representative of pixels of a document to be printed or displayed on a bilevel device. The image data is partitioned into data blocks of $2^n \times 2^n$ matrices of contiguous image data. The average tone density of each data block is determined and a corresponding number specifies how many of the total number of pixels of each data block are to be printed. Each data block is subpartitioned into subblocks comprising contiguous quarters of the block subpartitioned. The pixels to be printed for each subpartitioned block are divided among the subblocks based on the ratio of the average densities of the subblocks to the average density of the subpartitioned block. In turn, each subblock is subpartitioned into newly formed quarter subblocks with the pixels to be printed for each subpartitioned subblock being divided among the newly formed subblocks based on the ratio of the average densities of the newly formed subblocks to the average density of the subpartitioned subblock. These operations are repeatedly performed on all subblocks until each pixel to be printed has been assigned to a specific pixel location of the image data representative of the document.

9 Claims, 4 Drawing Figures

Microfiche Appendix Included
(2 Microfiche, 45 Pages)

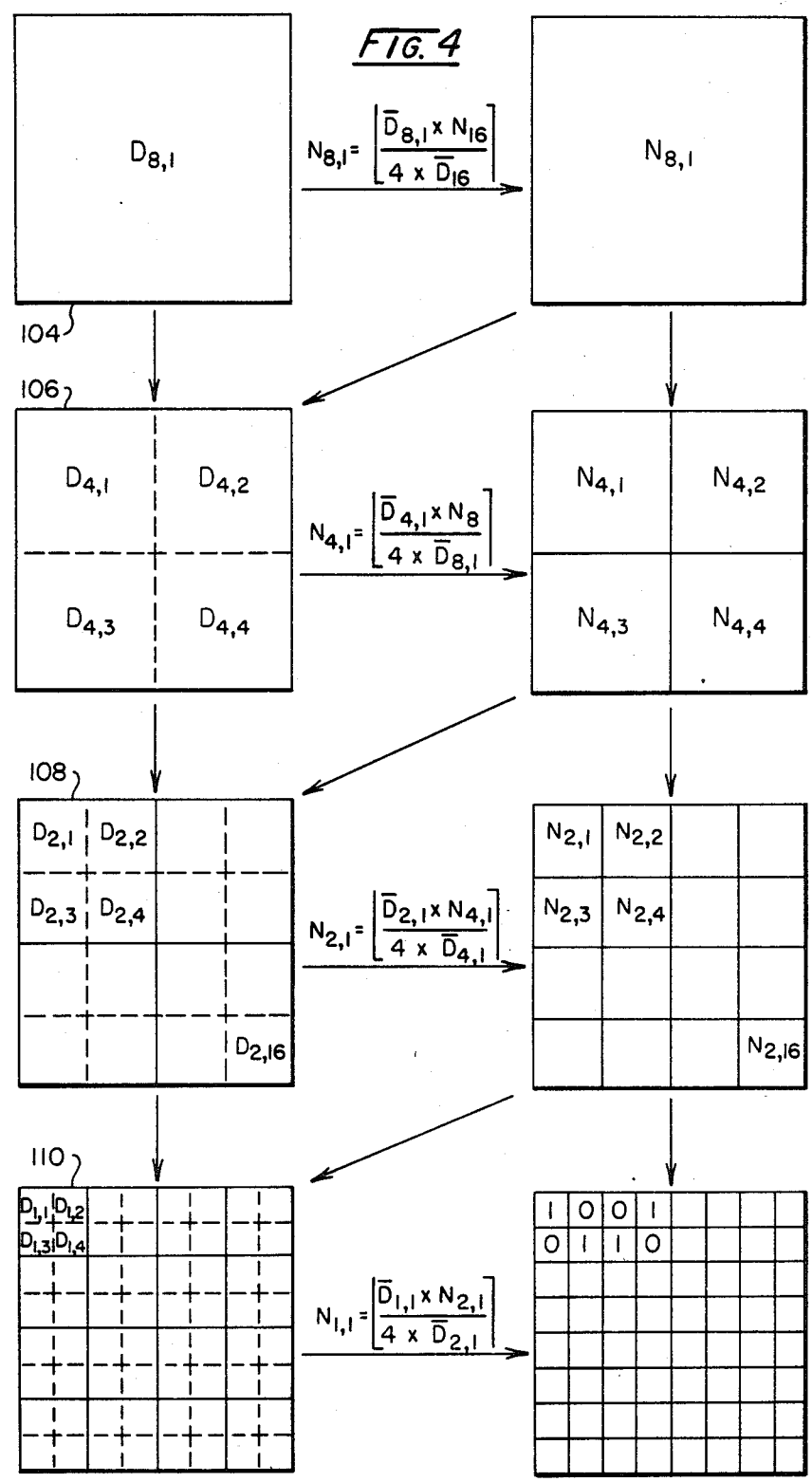

MULTIPLE MODE BINARY IMAGE PROCESSING

REFERENCE TO MICROFICHE APPENDIX

This application includes a microfiche appendix comprising 2 microfiche having a total of 45 frames.

BACKGROUND OF THE INVENTION

The present invention relates to image reproduction and, more particularly, to image data processing for bilevel printers or display devices which processing is equally applicable to text, continuous tone and halftone images.

Bilevel printing devices are characterized by having only two gray levels, e.g., black and white, for fixed sized spots on a prearranged geometric pattern. For bilevel printing devices, image data generated by scanning a document to be duplicated or displayed is processed generally dependent upon the type of data, i.e., text, continuous tone or halftone.

For the reproduction of continuous tone images, a number of processes have been developed based on pseudo halftone concepts which mimic the traditional halftone printing process wherein a variety of image gray levels are achieved through dot size variations. Since in these pseudo halftone processes each halftone spot is made up of a matrix of binary picture elements commonly referred to as pixels or pels, the effective resolution of the reproduction system is correspondingly reduced.

There are other processes which do not mimic the halftone process, but instead utilize localized information in deciding whether a particular spot should be printed or not. Error diffusion is one such technique having good detail rendition capabilities; however, it can also generate unwanted artifacts.

For text data, processes based on simple thresholding generally result in excellent reproduction. Such techniques include inherent enhancement features which sharpen the edges of line strokes. The same features, however, destroy any ability that the thresholding techniques might have in gray level distinction. Accordingly, text of different gray levels are reproduced with uniform density when a simple thresholding process is utilized.

Halftone originals present a different challenge to image processing. On a microscopic scale, halftone reproduction requirements are similar to those for text data. On a macroscopic scale, however, it is essential that the gray levels be duplicated without also introducing such artifacts as Moiré patterns. Techniques for treating halftone originals include that of constructing a continuous tone approximation to the halftone original and then applying methods that are suitable for continuous tone images.

In many applications, there is a need to treat all three types of image data since all three types of images may appear either in a single document or in separate documents to be reproduced or displayed. One technique in the prior art is to include individualized data processes for each of the types of data with the detection of local micoscopic characteristics being used to determine which process to apply to a given document or a given portion of a document. However, switching between individualized processes for the different types of image data is not failsafe and, if an inappropriate process is applied to a portion of image data, the results are far from satisfactory.

It is, thus, apparent that the need exists for a single, universal data processing method which can be applied to data representative of any one of the image types, i.e., text, continuous tone or halftone.

SUMMARY OF THE INVENTION

In accordance with the present invention, a universal image data processing method assigns print/no print values to the individual picture elements representative of a document to be reproduced or displayed for text, continuous tone and halftone data. The data processing method operates on a macroscopic scale to correctly reproduce the gray tone levels of a document and on a microscopic scale for distribution of the individual printed elements such that the spatial or phase information of the image of the document is correctly reproduced.

The process of the present invention operates on image data comprising gray scale values individually representative of small picture elements (pels or pixels) of a document to be printed or displayed on a bilevel printer or display device. Initially, the image data is partitioned into data blocks, each comprising an x by y matrix of contiguous image data, preferably with $x = y = 2^n$ where n is an integer. The average density of each of the data blocks is determined. A number is then assigned to each data block specifying how many of the total number of picture elements of each data block are to be printed. For example, if $n = 4$ such that each data block comprises a $16 \times 16$ matrix of contiguous image data representative of the gray scale values of 256 picture elements and the average density of a data block is determined to be 50%, 128 of the 256 picture elements are to be printed. Hence, a number of 128 would be assigned to that data block.

The thus assigned number of picture elements to be printed for each data block are then distributed by sub-partitioning each data block into subblocks each comprising a fractional portion of the image data of the subpartitioned block. The number of picture elements to be printed for each subpartitioned block are then divided among the subblocks based on the ratio of the average density of the subblocks to the average density of the subpartitioned block.

In turn, each subblock is subpartitioned into newly formed subblocks each comprising a fractional portion of the image data of the subpartitioned subblock. The number of picture elements to be printed for each subpartitioned subblock is then divided among the newly formed subblocks based on the ratio of the average density of the newly formed subblocks to the average density of the subpartitioned subblock. The steps of subpartitioning each subblock and dividing the number of picture elements among the newly formed subblocks is repeatedly performed until each picture element to be printed has been assigned to a specific picture element of the image data corresponding to the document to be reproduced or displayed.

When the data blocks comprise the preferred $2^n \times 2^n$ matrices, the subblocks preferably comprise contiguous quarters of the image data of the block or subblock from which it is subpartitioned and are defined by horizontal and vertical center lines of the block or subblock subpartitioned. In that event, the subpartitioning and distribution of the picture elements to be printed are continued until each picture element to be printed has been assigned to a location within a 2×2 matrix of picture elements which individually correspond to specific picture elements of the image data corresponding to the document to be reproduced or displayed.

Preferably, the assignment of the number of picture elements to be printed within a given data block comprises the steps of: selecting a tone reproduction curve; applying the selected tone reproduction curve to the average input density of each data block to derive an average output density; and, determining the number of picture elements to be printed for corresponding average output densities based on the printer or display device to be used. A preferred tone reproduction curve is defined by the equation:

$$O = I - \frac{[I_{max} - O_{max}]_+}{I_{max}^2} I^2$$

where I and O represent the input and output density values, respectively, and $$[I_{max} - O_{max}]_+ = \begin{cases} I_{max} - O_{max} \text{ for } (I_{max} - O_{max}) \geqq 0 \\ 0 \text{ for } (I_{max} - O_{max}) < 0. \end{cases}$$

It is, therefore, an object of the present invention to provide a single, universal image data processing method which is equally applicable to image data representative of text, continuous tone and halftone images.

It is another object of the present invention to provide a single, universal image processing method equally applicable to image data representative of text, continuous tone and halftone images wherein the image data is initially partitioned into data blocks having an assigned number of print locations for pixels represented by data within the data blocks based on the average density of the data blocks and assigning the pel locations within the data blocks to be printed by means of nested distribution wherein the data blocks are repeatedly subdivided with the pixels to be printed being divided among the subpartitioned subblocks based on the ratio of the average density of the subblocks to the average density of the block or subblock from which it was subpartitioned until each of the picture elements to be printed is distributed to a specific picture element of the data representative of the document to be reproduced or displayed.

Other objects and advantages of the invention will be apparent from the following description, the accompanying drawings and the appended claims.

BRIEF DESCRIPTION OF THE DRAWINGS

FIGS. 3 and 4 show the nested sequence of operations which perform the distribution of the picture elements to be printed within each data block.

DETAILED DESCRIPTION OF THE INVENTION

To accommodate text, continuous tone and halftone images, the image data processing method in accordance with the present invention must satisfy the following two requirements: (1) on a macroscopic scale, the gray tone levels of input image data must be correctly reproduced; and, (2) on a microscopic scale the distribution of the individual printed elements or dots must be such that the spatial or phase information of the image is reproduced. The terms "macroscopic" and "microscopic" are to be broadly interpreted in the above requirements; however, the meaning of these terms will become apparent during the description of image data processing hereinafter.

Image data processing in accordance with the present invention performs what is referred to as a nested dot distribution of picture elements to be printed to implement the above two requirements. The nested dot distribution generates print/no print picture element data for a document based on a set of scanned image data in the form of a two dimensional matrix array of density numbers or gray scale values for each of the picture elements. A tone reproduction curve transposes input image densities to output image densities to satisfy the first processing requirement, i.e., that gray tone levels be reproduced correctly.

Since different documents will have different maximum input density levels and generally originals tend to be darker than reproductions, a tone reproduction curve with varying amounts of tonal range compression is needed. Illustrative tone reproduction curves are known in the prior art, for example, see references by B. Dom, "Grayscale Compression in Reprography," *Photographic Sciences and Engineering*, Vol. 25, No. 5, Sept./Oct. 1981, and J. A. C. Yule, "Advances in Printing Science and Technology, Vol. 3—Halftone Printing," W. H. Banks Ed., Permagon Press, New York, 1964, pp. 17-42, which references are incorporated herein by reference. One such tone reproduction curve can be approximated by the following equation:

$$O = I - \frac{[I_{max} - O_{max}]_+}{I_{max}^2} I^2$$

where I and O denote the input and output density values, respectively, and the subscript max denotes a maximum value. For a given reproduction system, $O_{max}$ is a fixed value. The parameter $I_{max}$ varies with each given input document but is known from the scanned input data. The bracketed term has the definition:

$$[I_{max} - O_{max}]_+ = \begin{cases} I_{max} - O_{max} \text{ for } (I_{max} - O_{max}) \geqq 0 \\ 0 \text{ for } (I_{max} - O_{max}) < 0. \end{cases}$$

Figure 1:
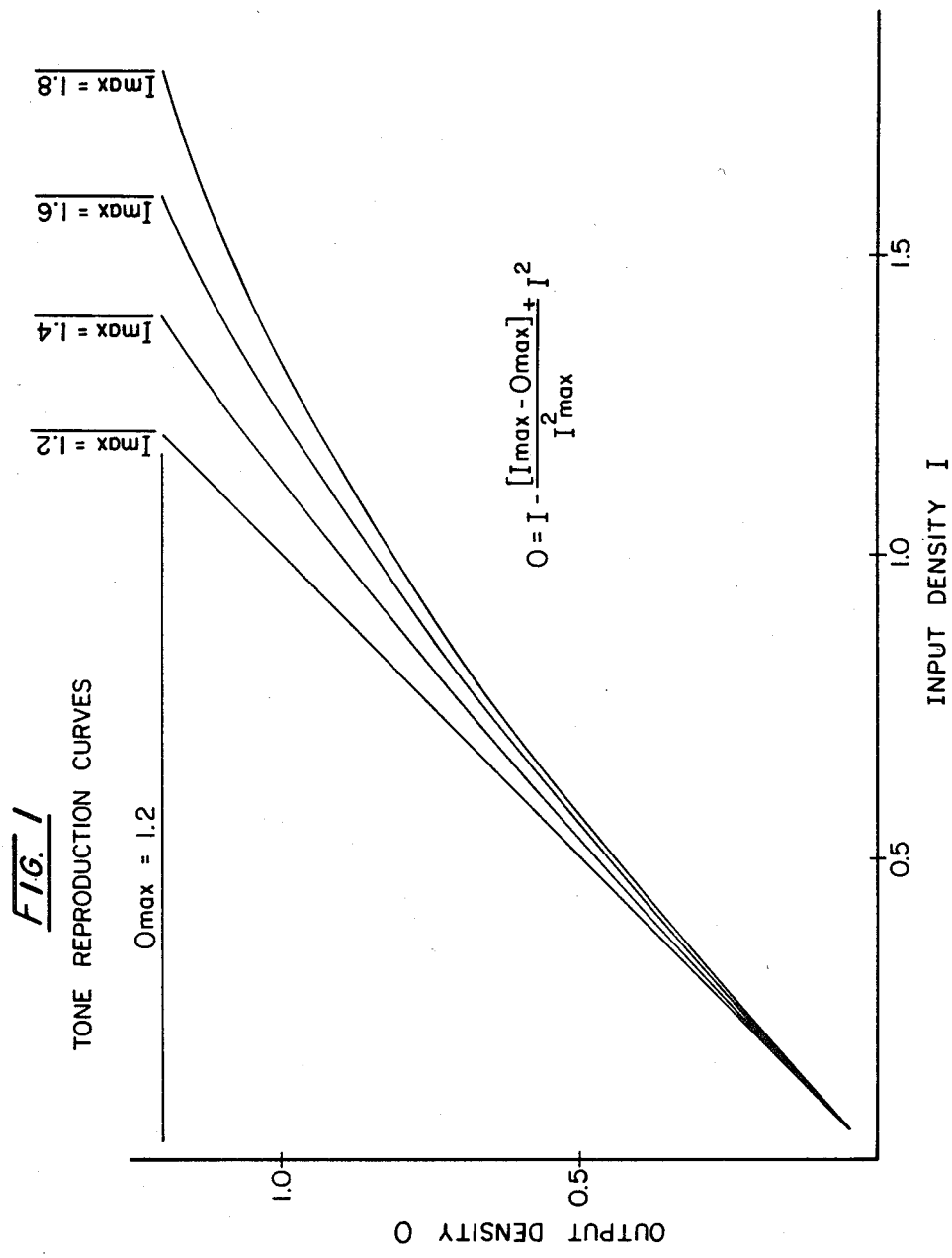
FIG. 1 is a family of tone reproduction curves having varying maximum input density values.

FIG. 1 shows a family of tone reproduction curves corresponding to the above equation with varying $I_{max}$ values. The lower limit is represented by the linear curve where $I_{max}$ is equal to $O_{max}$. At higher $I_{max}$ values, the tone reproduction curves show increased density range compression in the shadow region of the tonal range.

In summary, if the input density range is greater than the output density range, the preferred tone reproduction curve provides tonal range compression, while for input density ranges which are either equal to or less than the output density range, the preferred tone reproduction curve requires that the tonal level reproduction be exact. It is noted that the choice of the disclosed tone reproduction curve is an arbitrary one. The key concept in accordance with the present invention is that the reproduction of tonal levels be a precisely controlled function.

The implementation of the tone reproduction curve is by means of assigning the number of dots or picture elements to be printed in a given area such that the resulting output density is in accordance with the tone reproduction curve equation. While this can be done in a number of ways, as a convenience, the total image area is partitioned into blocks each represented by a $2^n \times 2^n$ matrix of scanned data where n is an integer.

Figure 2:
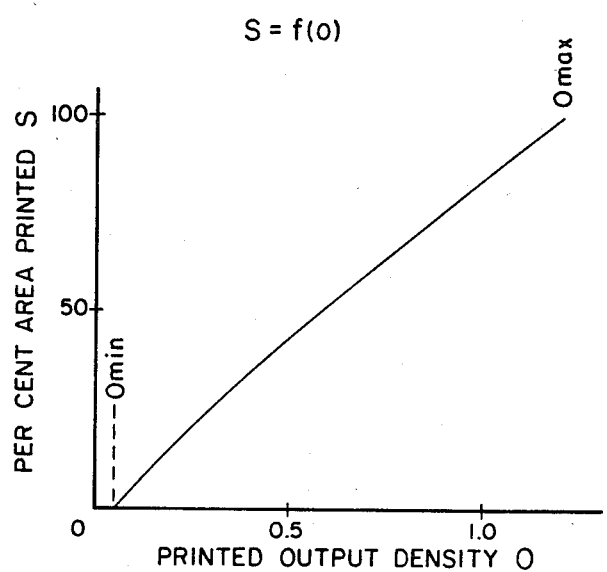
FIG. 2 is an empirically determined graph specifying the percent area of a data block which is to be covered by printed dots for corresponding output densities of the blocks.

For ease of illustration, let n=4 and a $16 \times 16$ pixel matrix area will then be taken as the macroscopic area referred to above relative to the first requirement for a successful universal processing method. In accordance with the equation for the tone reproduction curve, an empirical relationship is determined between the percent area covered by dots or printed picture elements, S, and the corresponding density measurement, O, for each particular printer or display device. Then, $$S = f(O); f(O_{max}) = 1; f(O_{min}) = 0,$$

which relationship is represented graphically in FIG. 2.

The average tone density value for each $16 \times 16$ data block or macroscopic area is computed as shown below where $D_{16}$ is a $16 \times 16$ matrix representing the data block and $\overline{D}_{16}$ is the average tone density for the data block.

$$D_{16} = \begin{bmatrix} D_{1,1} & \cdots & D_{1,16} \\ \vdots & & \vdots \\ D_{16,1} & \cdots & D_{16,16} \end{bmatrix}$$

$$\overline{D}_{16} = \frac{\sum_{i=1}^{16} \sum_{j=1}^{16} D_{ij}}{256}$$

From the tone reproduction curve or its originating equation shown above, an average output density value is obtained from the average input density value. Based on the derived average output density value and FIG. 2 or its originating equation shown above, the portion of the 256 pixels of the $16 \times 16$ matrix $D_{16}$ or macroscopic area which are to be printed is determined such that the required average output density value will be attained. In summary, FIGS. 1 and 2 and their originating equations determine from the $16 \times 16$ matrix $D_{16}$ of scanned image data how many of the 256 dots or picture elements are to be printed. However, they do not determine where these dots are to be printed.

In the illustrated implementation of the multiple mode binary image process, it has been presumed that the number of printed dots alone determines the resulting tone density. In practice, the relative location of the printed dots also has some secondary influence on the resulting density. This is especially true in ink jet printing where adjacent dots overlap one another. While the secondary effects are neglected in the present implementation for ease of illustration, a number of techniques for inclusion of such secondary influences will be apparent to those skilled in the art.

Figure 3:
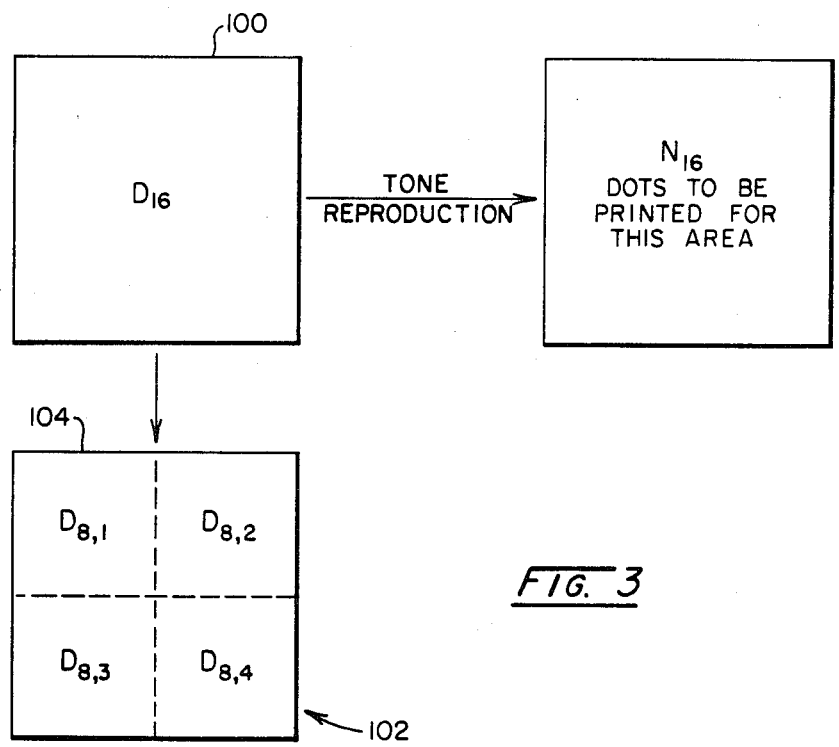

The remaining operation to be performed by the image data process of the present invention is to distribute the assigned number of dots or pixels to be printed for each given $16 \times 16$ matrix $D_{16}$ or macroscopic area to specific locations within the matrix. This distribution is performed by utilizing the detailed scanned information to fulfill the second requirement for a successful universal processing method recited above. The distribution is performed by a nested sequence of operations which will be described with reference to FIGS. 3 and 4.

The first step is to determine the number of dots or pixels, $N_{16}$, to be printed for each $16 \times 16$ matrix $D_{16}$ or data block 100. This determination is made as previously described with reference to FIGS. 1 and 2.

The next step is to subpartition each $16 \times 16$ data block 100 ($D_{16}$) into four $8 \times 8$ matrices or data subblocks 102. The assigned number of dots or pixels to be printed for each $16 \times 16$ data block 100 ($D_{16}$) is then distributed to the four $8 \times 8$ data subblocks 102 ($D_{8,1} - D_{8,4}$) based on the ratio of the average scanned densities of the individual $8 \times 8$ data subblocks 102 ($D_{8,1} - D_{8,4}$) to the average scanned density of the subpartitioned $16 \times 16$ data block 100 ($D_{16}$) together with the necessary arithmetical roundoff operation required since only integer number of dots can be assigned. The open-ended brackets shown in FIG. 4 indicate that the numbers are to be rounded off to an integer value and the "bars" over the data block identifications indicate average density values for the corresponding data blocks.

As shown in FIG. 4, each $8 \times 8$ data subblock represented by the subblock 104 ($D_{8,1}$) is again subpartitioned into four $4 \times 4$ matrices or data subblocks 106 ($D_{4,1} - D_{4,4}$). The number of dots or pixels $N_{8,1}$ to be printed in the subblock 104 ($D_{8,1}$) are distributed among the $4 \times 4$ data subblocks 106 ($D_{4,1} - D_{4,4}$) based on the ratio of the average densities $\overline{D}_4 - \overline{D}_{4,4}$ of the $4 \times 4$ data subblocks 106 ($D_{4,1} - D_{4,4}$) to the average density $\overline{D}_{8,1}$ of the subpartitioned $8 \times 8$ data subblock 104 ($D_{8,1}$). The subpartitioning and distribution of the assigned dots is repeated for each of the $4 \times 4$ data subblocks 106 ($D_{4,1} - D_{4,4}$) resulting in dot number assignments to sixteen $2 \times 2$ matrices or data subblocks 108 ($D_{2,1} - D_{2,16}$).

A final application of the nested dots distribution process results in the dots or pixels to be printed being assigned to individual pel locations 110 of the original macroscopic area matrix or data block 100 ($D_{16}$). The nested operations for the image data processing in accordance with the present invention not only assign the individual dots or pixels to be printed to specific locations within the individual data blocks represented by the data block 100 ($D_{16}$), but the assignment of the dots to be printed is done in accordance with the average spatial density distribution of the scanned image data.

The present invention can be implemented in a variety of hardware and software configurations as will be apparent to those skilled in the art. An illustrative software embodiment of the present invention is included in the above-referenced microfiche appendix. The software embodiment is programmed in Event Driven Language (EDL) and is used to control an IBM Series/1 computer.

While the method herein described constitutes a preferred embodiment of this invention, it is to be understood that the invention is not limited to this precise method and that changes may be made without departing from the scope of the invention which is defined in the appended claims.

What is claimed is:

1. A method of processing image data comprising gray scale values individually representative of small picture elements of a document to be printed or displayed on a bilevel printer or display device, said method comprising the steps of:
   (a) partitioning said image data into data blocks each comprising an x by y matrix of contiguous image data;
   (b) determining the average input density of each of said data blocks;
   (c) assigning a number corresponding to how many of the total picture elements of each of said data blocks are to be printed based on the average density of each data block;
   (d) distributing the number of picture elements to be printed within each data block by applying the following substeps:
      (1) subpartitioning each data block into subblocks each comprising a fractional portion of the image data of the subpartitioned block;
      (2) dividing the number of picture elements to be printed for each subpartitioned block among the subblocks based on the ratios of the average densities of the subblocks to the average density of the subpartitioned block;
      (3) subpartitioning each subblock into new subblocks each comprising a fractional portion of the image data of the subpartitioned subblock;
      (4) dividing the number of picture elements to be printed for each subpartitioned subblock among the newly formed subblocks based on the ratios of the average densities of the newly formed subblocks to the average density of the subpartitioned subblock; and
      (5) repeatedly performing substeps (3) and (4) for all subblocks until each picture element to be printed has been assigned to a specific picture element of said document.

2. A method of processing image data as claimed in claim 1 wherein the assignment of the number of picture elements to be printed within a data block comprises the steps of:
   (e) selecting a tone reproduction curve;
   (f) applying the selected tone reproduction curve to the average input density of each data block to derive an average output density; and
   (g) determining the number of picture elements to be printed for corresponding average output densities based on the printer or display device to be used.

3. A method of processing image data as claimed in claim 2 wherein said tone reproduction curve is defined by the equation:

$$O = I - \frac{[I_{max} - O_{max}]_+}{I_{max}^2} I^2$$

where I and O represent the input and output density values, respectively, the subscript "max" denotes a maximum value, and $$[I_{max} - O_{max}]_+ = \begin{cases} I_{max} - O_{max} \text{ for } (I_{max} - O_{max}) \geq 0 \\ 0 \text{ for } (I_{max} - O_{max}) < 0. \end{cases}$$

4. A method of processing image data as claimed in claim 1 wherein $x = y = 2^n$ where n is an integer.

5. A method of processing image data as claimed in claim 4 wherein each subblock comprises a contiguous portion of the image data of the block or subblock from which it is subpartitioned.

6. A method of processing image data as claimed in claim 5 wherein each subblock comprises a contiguous quarter of the image data of the block or subblock from which it is subpartitioned, said subblocks being defined by horizontal and vertical center lines of the block or subblock subpartitioned.

7. A method of processing image data comprising gray scale values individually representative of small picture elements of a document to be printed or displayed on a bilevel printer or display device, said method comprising the steps of:
   (a) partitioning said image data into data blocks each comprising a $2^n \times 2^n$ matrix of contiguous image data, n being an integer;
   (b) determining the average input density of each of said data blocks;
   (c) assigning a number of picture elements within each of said data blocks which picture elements are to be printed, said number of picture elements to be printed being derived from the average input density of each data block;
   (d) distributing the number of picture elements to be printed within each data block by applying the following substeps:
      (1) quartering each data block into four subblocks each comprising a $2^n/2 \times 2^n/2$ matrix of contiguous image data of the subpartitioned block;
      (2) dividing the elements to be printed for each subpartitioned block among the subblocks based on the ratios of the average densities of the subblocks to the average density of the subpartitioned block;
      (3) subpartitioning each subblock into four newly formed subblocks each comprising a contiguous quarter of the image data of the subblock from which it is subpartitioned and defined by horizontal and vertical center lines through the subpartitioned subblock;
      (4) dividing the number of picture elements to be printed for each subpartitioned subblock among the newly formed subblocks based on the ratios of the average densities of the newly formed subblocks to the average densities of the respective subpartitioned subblocks; and
      (5) repeatedly performing substeps (3) and (4) for all subblocks until each picture element to be printed has been assigned to a location within a $2 \times 2$ matrix of picture elements which corresponds to a specific picture element of said document.

8. A method of processing image data as claimed in claim 7 wherein the assignment of the number of picture elements to be printed within a data block comprises the steps of:
   (e) selecting a tone reproduction curve;
   (f) applying the selected tone reproduction curve to the average input density of each data block to derive an average output density; and
   (g) determining the number of picture elements to be printed for corresponding average output densitites based on the printer or display device to be used.

9. A method of processing image data as claimed in claim 8 wherein said tone reproduction curve is defined by the equation:

$$O = I - \frac{[I_{max} - O_{max}]_+}{I_{max}^2} I^2$$

where I and O represent the input and output density values, respectively, the subscript "max" denotes a maximum value, and $$[I_{max} - O_{max}]_+ = \begin{cases} I_{max} - O_{max} \text{ for } (I_{max} - O_{max}) \geq 0 \\ 0 \text{ for } (I_{max} - O_{max}) < 0. \end{cases}$$

* * * * *